(12) United States Patent
Ashoori et al.

(10) Patent No.: US 10,885,080 B2
(45) Date of Patent: *Jan. 5, 2021

(54) COGNITIVE RANKING OF TERMS USED DURING A CONVERSATION

(71) Applicant: International Business Machines Corporation, Armonk, NY (US)

(72) Inventors: Maryam Ashoori, White Plains, NY (US); Ashish Kundu, Elmsford, NY (US); Amit A. Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/888,164

(22) Filed: Feb. 5, 2018

(65) Prior Publication Data

US 2019/0243917 A1 Aug. 8, 2019

(51) Int. Cl.
*G06F 16/33* (2019.01)
*G06F 16/901* (2019.01)
*G06F 16/36* (2019.01)

(52) U.S. Cl.
CPC ........ *G06F 16/3344* (2019.01); *G06F 16/367* (2019.01); *G06F 16/9024* (2019.01)

(58) Field of Classification Search
CPC ...... G06F 16/3344; G06F 40/35; G06F 40/00; G06F 16/367; G06F 16/9024
USPC .......................... 707/706, 723, 730, 736, 798
See application file for complete search history.

(56) References Cited

U.S. PATENT DOCUMENTS

| 8,218,785 | B2 | 7/2012 | Von Wiegand | |
| 8,244,828 | B2 * | 8/2012 | Anderson | H04N 21/41407 709/217 |
| 9,466,297 | B2 * | 10/2016 | Crook | G06F 40/30 |
| 10,452,923 | B2 * | 10/2019 | Block | G06K 9/00718 |
| 2005/0066358 | A1 * | 3/2005 | Anderson | H04N 21/6582 725/39 |

(Continued)

OTHER PUBLICATIONS

List of IBM Patents or Patent Applications Treated as Related, Feb. 5, 2018, 2 pages.

(Continued)

*Primary Examiner* — Phong H Nguyen
(74) *Attorney, Agent, or Firm* — Stephen J. Walder, Jr.; Feb R. Cabrasawan

(57) ABSTRACT

Mechanisms are provided for implementing a conversation monitoring system. The conversation monitoring system monitors a conversation between at least two participants and extracting, by the conversation monitoring system, key terms present in communications between the at least two participants. The conversation monitoring system generates a provenance graph data structure based on the extraction of the key terms where the provenance graph data structure has speaker nodes representing the at least two participants, term nodes representing the key terms present in the communications, and edges connecting nodes in the provenance graph. The conversation monitoring system analyzes the provenance graph data structure to identify a relative ranking of the key terms within the conversation and generates an output representing content of the conversation based on the relative ranking of the key terms.

18 Claims, 6 Drawing Sheets

(56) References Cited

U.S. PATENT DOCUMENTS

| | | |
|---|---|---|
| 2011/0125734 A1 | 5/2011 | Duboue et al. |
| 2014/0038578 A1 | 2/2014 | Bouzid et al. |
| 2015/0162020 A1 | 6/2015 | Deshmukh et al. |
| 2015/0181020 A1 | 6/2015 | Fitzsimmons et al. |
| 2016/0163311 A1* | 6/2016 | Crook .................... G10L 15/065 704/275 |
| 2016/0269554 A1* | 9/2016 | Cecchi ................ H04M 3/5175 |
| 2017/0097928 A1 | 4/2017 | Davis Jones et al. |
| 2019/0163982 A1* | 5/2019 | Block .................... G06N 5/022 |
| 2020/0050871 A1* | 2/2020 | Block ................ G06K 9/6267 |

OTHER PUBLICATIONS

Fader, Anthony et al., "MavenRank: Identifying Influential Members of the US Senate Using Lexical Centrality", Proceedings of the 2007 Joint Conference on Empirical Methods in Natural Language Processing and Computational Natural Language Learning, Jun. 2007, pp. 658-666.

High, Rob, "The Era of Cognitive Systems: An Inside Look at IBM Watson and How it Works", IBM Corporation, Redbooks, Dec. 12, 2012, 16 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

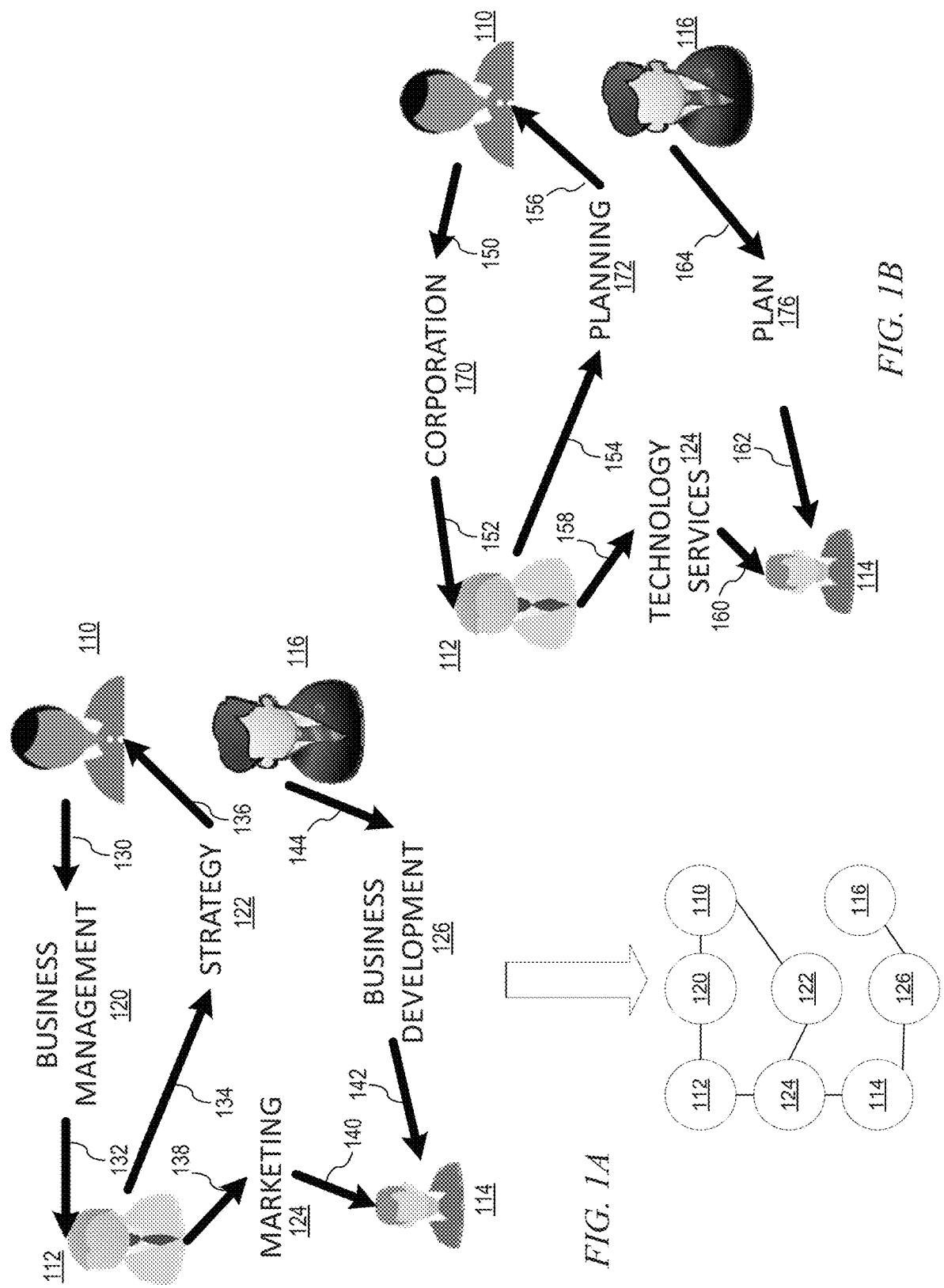

COGNITIVE RANKING OF TERMS USED DURING A CONVERSATION

BACKGROUND

The present application relates generally to an improved data processing apparatus and method and more specifically to mechanisms for cognitive ranking of terms used during a conversation.

Various types of conversation assistants have been disclosed. For example, U.S. Pat. No. 8,218,785 issued to Thomas E. Von Wiegand and entitled "Conversation Assistant for Noisy Environments" provides a conversation assistant in which an infrared (IR) emitter having a broad emission pattern driven by a frequency-modulated (FM) carrier signal enables electronic communication between multiple talkers and multiple listeners. With this conversation assistant, a narrow reception pattern on the listener's receiving unit combined with the inherent capture effect of FM coding provides each listener with the means of easily and naturally selecting one of many talkers from a group. A close microphone for the talking party and a close earphone for the listening party enables the system to assist conversation particularly in the case of noisy environments by improving the signal to noise ratio. A similar system of broad emission transmitters and narrow reception can be used in other systems, such as a teleconferencing unit in which users have transmitters and receivers and a teleconferencing unit has multiple receivers arranged to receive signals in multiple different sectors.

Another type of conversation assistant is described in U.S. Patent Application Publication No. 2014/0038578, filed by Bouzid et al., and entitled "Conversation Assistant." With the conversation assistant of this publication, usage data associated with a user of a telephonic device is accessed by a remote learning engine. A service or a product that is likely to be of interest to the user is identified by the remote learning engine based on the accessed usage data. A recommended voice bundle application for the user is determined by the remote learning engine based on the accessed usage data, the recommended voice bundle application being a voice application that, when executed by the telephonic device, results in a simulated multi-step spoken conversation between the telephonic device and the user to enable the user to receive the identified service or the identified product. A recommendation associated with the recommended voice bundle application is transmitted from the remote learning engine to the telephonic device. The recommendation is presented by the telephonic device to the user through voice communications. The user through voice communications has accepted the recommendation determining is determined by the telephonic device. In response to determining that the user has accepted the recommendation, the recommended voice bundle application on the telephonic device is executed by the telephonic device.

In still another conversation assistant mechanism, as described in U.S. Patent Application Publication 2017/0097928, filed by Davis Jones et al., entitled, "Guiding a Conversation Based on Cognitive Analytics," and assigned to International Business Machines Corporation of Armonk, N.Y., mechanisms are provided to guide a conversation based on cognitive analytics. With this conversation assistant, data of the conversation up to a time in the conversation is received from a conversation interface while the conversation is continuing. Current data is received from a data source that relates to a remote participant in the conversation and a topic in the conversation. A sentiment value of the remote participant during the conversation is determined from the current data and the conversation data. While the conversation is continuing, data of a prompt is introduced into the conversation. The data of the prompt is configured to cause the conversation to increase the sentiment value of the remote participant. A profile of the remote participant is updated with the sentiment value, to form an updated profile. The updated profile is used as a second data source in a later portion of the conversation.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory coupled to the at least one processor, wherein the at least one memory comprises instructions which are executed by the at least one processor to configure the data processing system to implement a conversation monitoring system. The method comprises monitoring, by the conversation monitoring system executing on the data processing system, a conversation between at least two participants and extracting, by the conversation monitoring system, key terms present in communications between the at least two participants. The method further comprises generating, by the conversation monitoring system, a provenance graph data structure based on the extraction of the key terms. The provenance graph data structure comprises speaker nodes representing the at least two participants, term nodes representing the key terms present in the communications, and edges connecting nodes in the provenance graph. The method also comprises analyzing, by the conversation monitoring system, the provenance graph data structure to identify a relative ranking of the key terms within the conversation and generating, by the conversation monitoring system, an output representing content of the conversation based on the relative ranking of the key terms.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 1A-1C are example diagrams of a provenance graph for a conversation at different time points in accordance with one illustrative embodiment;

DETAILED DESCRIPTION

Figure 2:
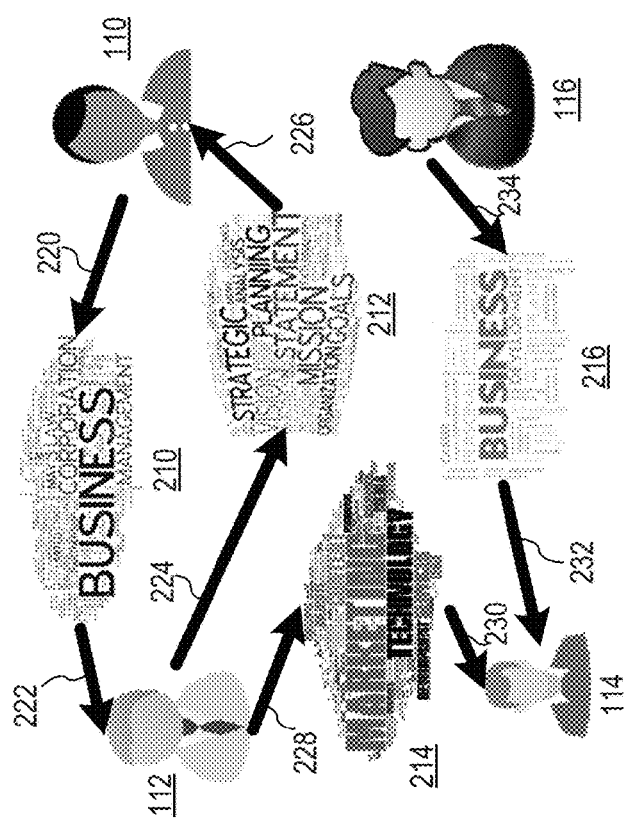
FIG. 2 is an example diagram of an aggregate provenance graph for a conversation in accordance with one illustrative embodiment.

The illustrative embodiments provide mechanisms for performing cognitive ranking of terms used during a conversation, which may be a multi-modal conversation. This ranking of terms may be used by a conversation assistance system to perform various operations. For example, the ranking of terms may be utilized to perform conversation summarizations. With such summarizations, a relative ranking of speakers may be generated to identify which speakers provided valuable input, and the extent to which such speakers provide valuable input, to the conversation. The "value" of a speaker's input may be evaluated based on a variety of different characteristics including, but not limited to, a weighting factor associated with the speaker based on evaluations of the speaker during previous conversations, a role of the speaker with regard to the conversation (organizer of the conference, invitee, moderator, etc.), relative role within an organization, expertise in a specified topic of the conversation, dynamic determinations of "value" based on quantifiable contributions to the conversation, etc. The ranking of terms may also be utilized to identify terms that require additional explanation and provide clarifying output from a cognitive system to assist with the conversation being conducted.

With the mechanisms of the illustrative embodiments, a conversation is monitored to identify the terms being spoken and the speakers from which the spoken terms are received. The conversation may be multi-modal and may include one or more of an audio conversation (telephone based conversation, Voice over IP (VOIP) conversation, Web based meeting conversation, or the like), a textual conversation (instant messaging, chat group, etc.), a video based conversation, or any combination of two or more of these. The identification of terms spoken may make use of any speech recognition and/or natural language processing mechanism that is generally known, or later developed, that has the capability of converting speech to text and then analyzing the text to identify key terms/phrases, or taking text as an input and identifying key terms/phrases.

The identification of the speaker may be performed in any suitable manner for the particular implementation. For example, identification of the speaker may be performed based on login information used to log into a system for facilitating the conversation. In some embodiments, device identifiers of the devices used by the various speakers may be used to correlate the device with a particular speaker. With regard to text input, such device identifiers and/or log in information may be obtained when the user logs in to the system or otherwise transmits a textual message, as is generally known in the art. In some implementations, voice recognition technology, facial recognition technology, or any other audio or image data analysis mechanisms capable of identifying individual persons, may be used to recognize the speaker in situations where specific separate devices are not utilized for each of the speakers, e.g., when the speakers are present in the same physical location and are speaking within a monitored environment.

The identification of the speaker, where the term "speaker" means the source of a portion of a conversation whether that portion is speech input, text input, or a combination of speech and text, may be correlated with the speech/text input and the particular key terms/phrases extracted from this speech/text input such that it is known to the mechanisms of the present invention what speakers provided a speech/text input and what key terms/phrases are in the speech/text input from those speakers. The speakers are participants in the conversation, however not all participants are necessarily speakers, e.g., some participants may operate in a listen only mode and may not contribute content to the conversation. For purposes of the description of the illustrative embodiments, it will be assumed that the input from the speaker is a spoken input which is converted to a textual representation and thus, the following description will make reference to a "speaker" and "speech input." It should be appreciated that the illustrative embodiments may also be utilized with direct textual input and text based conversations in which conversion from speech to text is not necessary.

The illustrative embodiments utilize a provenance graph to represent the progression of the conversation. The provenance graph is a data structure that is updated as the conversation proceeds and represents associations of key terms/phrases present in the conversation with the sources of these key terms/phrases, i.e. participants in the conversation that provided the messages/inputs in which the key terms/phrases are present, also referred to herein as the "speaker." Thus, the "provenance" is the attribution of key terms/phrases with particular speakers during the conversation and these associations are represented in a graph data structure using nodes and edges linking nodes.

A separate provenance graph may be generated for each separate conversation, or sub-conversation that may be identified. Each key term/phrase node in the provenance graph represents a portion of the conversation and may have attributes including, for example, a key term/phrase spoken (texted), a timestamp of the portion of the conversation, an identification of the speaker, an identification of a target of the portion of the conversation (e.g., another participant in the conversation), a geolocation where the portion of the conversation is generated, if available, and the like. Additional nodes may be provided for speakers or participants in the conversation and may have attributes defining characteristics of the particular speakers/participants, such as demographic information, role information, organizational information, etc. An edge from one node to another in the provenance graph represents a temporal flow to the next term/phrase spoken (texted) in the conversation. The node and edges may have associated weight values assigned to them based on various factors, such as weights associated with the particular term/phrase, topic of the term/phrase in the conversation, the particular speaker that is the source of the portion of the conversation, the amount of time or length of continuous speaking by the speaker up to that particular portion of the conversation, etc.

Based on the speech input (also referred to as a "message" herein) and identification of the speaker, the provenance graph is dynamically updated or generated to include one or more nodes corresponding to the speech input (portion of conversation) where the nodes specify, among other attributes, the speaker and corresponding key terms/phrases extracted from the speech input. For example, if a provenance graph has not yet been generated for the conversation, then an initial provenance graph is generated with nodes corresponding to the speaker and the key terms/phrases extracted from the speech. If a provenance graph has already been generated for the conversation, the provenance graph is updated to include new nodes corresponding to the speaker and key terms/phrases. This continues as new speech input is received from the same and/or different speakers during the conversation. As a result, a provenance graph is generated that represents the entire conversation.

The provenance graph for the conversation, at any point during the conversation, or after the conversation has concluded, may be analyzed using graph analytics techniques to determine a statistical ranking for each node based on the attributes of the node including the speaker and/or terms/phrases spoken and represented by the node. The rankings of the nodes may then be output as the relative ranking of the speakers/terms/phrases. In the case where there may be multiple provenance graphs associated with a conversation, e.g., sub-conversations or separate conversations going on within the context of an overall conversation session, e.g., a conversation just between two parties in an overall conversation session having more than two parties, the multiple provenance graphs may be merged into a single overall provenance graph. Rankings may be performed with regard to individual provenance graphs and the overall merged provenance graph. In some embodiments, rather than merging the provenance graphs, the rankings of nodes in individual provenance graphs may be merged to generate merged rankings based on speaker, terms/phrases, timing, and other attributes of the nodes of the provenance graphs.

The ranks of the nodes may be computed in a variety of different ways. For example, nodes may be ranked using a recursive ranking algorithm. The rankings may be computed based on the number of edges in the provenance graph that flow into and/or out of the nodes. The rankings may be computed based on characteristics of the speaker(s) with which the node is associated, e.g., based on a weight of the speaker from previous conversations, based on how many edges are associated with the speaker, an organizational position or role of the speaker, a relative importance of the speaker with regard to the particular conversation (organizer, facilitator, invitee, reviewer, etc.), the speaker's expertise with regard to topics of the conversation, a relative measure of how much of the conversation is attributed to the speaker, etc.

The calculated rankings may then be utilized to perform an operation based on the relative rankings of terms/phrases, speakers, and the like. For example, based on the relative rankings of terms/phrases and speakers, the more important terms/phrases may be identified and included in a summarization of the conversation. Moreover, the terms/phrases may be attributed to the speakers having the relatively higher rankings. Of course, threshold rankings may be specified and only those terms/phrases and speakers whose rankings meet or exceed the threshold rankings may be included in the summarization. In embodiments where rankings are calculated dynamically during the conversation, the ranking of terms may also be utilized to identify terms that require additional explanation and provide clarifying output from a cognitive system to assist with the conversation being conducted.

Other types of operations may also be performed based on the relative rankings of terms/phrases and speakers either during the conversation dynamically, or as a post processing of the provenance graph data structure after conclusion of the conversation. For example, based on historical rankings of terms in multiple conversations, the mechanisms of the illustrative embodiments may differentiate between stable and emerging terms. An emerging term, though lower in rank, may inform about important imminent changes in strategy or decisions within an organization, for example. Such stable vs. emerging terms may be identified by computing a TF-IDF metric associated with the various terms as identified in the provenance graph data structures and/or relative rankings of nodes in these provenance graph data structures associated with various conversations, for example.

Another type of cognitive operation that may be performed is to analyze a pattern of activity during the conversation, as represented by the provenance graph data structure and the temporal flows represented by the edges in the provenance graph data structure, to determine a level of influence of various speakers during the conversation. For example, during the course of a conversation, suppose a term is ranked highest for a first speaker, e.g., speaker S1. Thereafter, assume that the ranking of this same term for other speakers S2 and S3 in the conversation increases as the conversation progresses, i.e. over time represented by edges between term nodes. If the ranking of the term with other speakers increases over time, this may be indicative of the first speaker S1 being influential during the conversation with regard to the other speakers. Thus, a weighting of the first speaker may be dynamically adjusted over time as the speaker is determined to be more influential. This type of cognitive operation may also be extended over multiple conversations and thus, multiple provenance graph data structures to determine how the speaker's influence progresses over time across conversations, i.e. determine how the speaker is "imitated" by other speakers in later conversations indicating greater influence of the speaker and performing dynamic adjustments of weights associated with the speaker.

Thus, with the mechanisms of the illustrative embodiments, by generating ranks of terms spoken in the conversation using a conversation provenance graph, the mechanisms of the illustrative embodiments may generate a conversation summary data structure that summarizes the conversation driven by the ranked terms. Moreover, the ranked terms may provide a glossary of the conversation in the conversation summary data structure and the topics discussed during the conversation may be outlined with levels of importance represented by the rank of the terms associated with those topics. Furthermore, by generating the ranks of the speakers, the mechanisms of the illustrative embodiments can determine the speakers who contributed most to the conversation, the speakers who communicated the most important terms/phrases, and in general were most influential with the other participants in the conversation.

All of this information may be used to provide decision support services for various decisions as well as may be a basis for performing cognitive operations for providing such decision support services. For example, the information generated for a conversation by the mechanisms of the illustrative embodiments may be used to drive cognitive operations for providing decision support services for personnel decisions, e.g., hiring, firing, promotion, disciplinary action, etc. Moreover, such information may be used to identify topics of interest and areas where further inquiries or expenditure of resources is warranted.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for ranking terms/phrases and/or speakers during a conversation. The ranking of the terms/phrases and/or speakers may be used to generate summarizations of the conversation, identify portions of the conversation where additional assistance with the conversation may be needed, or the like. The ranking may be performed based on a dynamically generated provenance graph which comprises nodes and edges that link key terms/phrases of the conversation with speakers during the conversation. Characteristics of the speakers, statistical measures of the terms/phrases within the conversation, and the like, may be used to evaluate the rank of the terms/phrases and/or speaker.

Figure 1C:
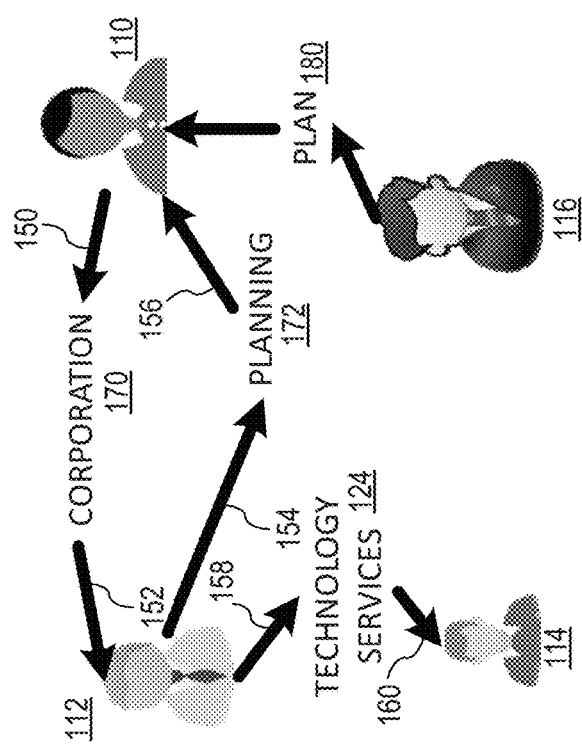

FIGS. 1A-1C illustrate an example of a dynamic provenance graph generation in accordance with one illustrative embodiment. The provenance graph 100 in FIG. 1A represents a portion of a conversation between multiple parties at a first time point T1. As shown in FIG. 1A, the provenance graph 100 comprises nodes 110-116 representing different speakers participating in the conversation. The identities of these speakers may be performed, as noted above, in any of a variety of ways including identifying speakers based on login information, facial recognition, speech recognition, image analysis, device identifiers of specific devices used to transmit user input (speech/text) as part of the conversation, or the like. For example, assume that a web conference application is utilized in which each participant logs into the conference via a computing device and in the process, identifies themselves for authentication. This information may be used to identify the participant. The communications as part of the conference may be performed via the participants calling into a central conference telephone line, utilize voice transmission over a data network (e.g., Voice over IP (VOIP)), performing text based instant messaging, or any other means generally known or later developed for communicating via voice or text communication.

Based on the identity of the participants, corresponding profiles of the participants may be retrieved, such as from social networking service user profile registries, conference system registries, organizational registries, or any other user profile sources that may provide information about the characteristics of the various participants. These characteristics may include, for example, demographic information for the participants, location information, organizational position of the participants, roles of the participants within the conversation, etc. The participant information may also be correlated with configuration information for the conversation, such as whether or not the participant is an organizer of the conversation, an invitee to the conversation, a moderator of the conversation, an invited speaker for the conversation, e.g., a specialized participant specifically invited to speak on a topic of interest, or the like.

The conversation between the participants is monitored, such as by speech-to-text conversion mechanisms, natural language processing systems, and the like, to identify words spoken, or texted, as part of the conversation and extract key terms/phrases present in the content of the messages or inputs provided by the participants. The captured audio/text is correlated with a speaker, i.e. a participant that is the source of the captured audio/text. This may be done in a straight forward manner if the speaker uses a specifically identifiable device to provide the messages or input, e.g., a particular computer, a particular telephone of other voice communication device, or the like. In other cases, such as when the participants 110-116 are all physically present within a monitored environment (e.g., a conference room), additional mechanisms may be utilized to help identify a participant that is a source of the message/input. For example, cameras capturing images of the monitored environment, audio based directional determination mechanisms correlated with captured images, and the like, may be used to identify a particular participant in the monitored environment as being the source of the message/input. Facial recognition or other identification mechanisms may be used to identify the particular participant and track movement of the participant within the monitored environment.

Essentially, the mechanisms of the illustrative embodiments identify the source of a received message/input corresponding to a portion of the conversation. In addition, the mechanisms of the illustrative embodiments may perform natural language processing on the messages/inputs received from the participants in the conversation. This may be done, for example, after the audio message/input is captured and converted to a textual representation upon which the natural language processing is performed. The natural language processing may extract key terms/phrases from the messages/input based on training of the natural language processing mechanisms. This training may be for specific domains or may be more general depending on the desired implementation. The natural language processing may have resources, such as dictionary data structures, synonym data structures, and the like, to facilitate the identification of key terms/phrases within natural language text corresponding to messages/inputs from participants of a conversation.

The extracted terms/phrases are associated with the particular participants that are determined to be the source of the message/input. In addition, mechanisms such as those described above, may be used to identify a target of a particular message/input. For example, if messages/inputs are directly transmitted from one device to another, then it is fairly straight forward to identify the target of a message/input. In other cases, various mechanisms may be used to analyze the audio, text, patterns of exchanged messages/input, gestures and eye contact analysis based on image data, and the like, to identify other participant(s) to which the speaker (i.e. the source participant for a message/input) is directing the message/input.

Based on the identification of the key terms/phrases, source of the message/input, and target of the message/input, a portion of the provenance graph may be generated including nodes 110-116 for the participants involved, nodes 120-126 for the key terms/phrases identified in the message/input, and edges 130-144 indicating relationships between the participant nodes 110-116 and the key terms/phrases nodes 120-126. The edges may have a direction showing the flow of the messages/inputs from one participant to another. Thus, the provenance graph may be a directed acyclic graph in some embodiments or in some cases may be a graph that may include cycles.

For example, as shown in FIG. 1A, a first participant 110 may communicate to a second participant 112 a message/input that is analyzed to identify a key term/phrase of "business management." A corresponding node 120 for the term/phrase "business management" is generated having attributes specifying the source 110, the target 112, timestamp of the message/input, and other attributes of the instance of the term "business management" within the context of the conversation. Similarly, the participant 112 may communicate with participant 110 with a message having a key term/phrase of "strategy" with a corresponding node 122 and edges 134, 136 being generated as part of the provenance graph 100. Similar additions to the provenance graph 100 may be generated between participants 112, 114, and 116 with key terms/phrases of "marketing" 124 and "business development" 126 resulting in nodes 124, 126 and edges 138, 14, 142, and 144. All of this may be captured at a first time point T1 during the conversation as participants 110-116 are exchanging messages/input with one another.

At a second time point during the conversation, as illustrated in FIG. 1B, the participants 110-116 exchange messages/inputs with each other having different key terms/phrases which are likewise represented as nodes 170-176 and edges 150-164 in the provenance graph 100. It should be appreciated that for purposes of the illustration, the message/input exchanges are between the same participants 110-116 however, new exchanges, such as between participant 110 and participant 116 may also be represented in the provenance graph 100 as well.

At a third time point during the conversation, as illustrated in FIG. 1C, the participants 110-116 are exchanging messages/input with each other similar to what is shown in FIG. 1B, but in this case the conversation flow between participant 116 and 114 discontinues and participant 116 is now exchanging messages/input with participant 110 regarding the "plan", represented as term node 180. The various time points T1 through T3 are all time points during a conversation where each of the FIGS. 1A-1C show those nodes and conversation flows between participants that are occurring at the time point. These provenance graphs of the various time points may in fact be separate provenance graphs or layers or portions of the same provenance graph. It should be appreciated, as will be illustrated in FIG. 2, that when separate provenance graphs are aggregated, insignificant portions of the conversation may be no longer present in the aggregation. Thus, as will be shown in FIG. 2 hereafter, the portion of the conversation flowing between participant 116 and 110 in FIG. 1C is not present in the aggregate provenance graph shown in FIG. 2.

Further, it is also possible to generate other subsidiary graphs from the provenance graphs. For example, a word-cloud may be generated from the terms (and their frequencies) on the edges in the provenance graph, such as shown in FIG. 2.

The process of detecting message/input exchanges between participants 110-116, extracting key terms/phrases from the messages/inputs to form nodes and edges in the provenance graph 100, and associating the key terms/phrase nodes with sources, targets, and timestamps, among other attributes, may be continued throughout the duration of the conversation, i.e. for subsequent time points greater than time T2 up to an end event, e.g., termination of the conference, user discontinuing of the monitoring of the conversation, timeout condition such as lack of detection of messages/input for a predetermined period of time, etc.

Dynamically during the conversation, graph analytics techniques may be applied to the provenance graph to identify relative rankings of key terms/phrases being exchanged in messages/inputs from the various participants 110-116. This may be done on an individual nodal basis or across nodes associated with different sources/targets. Various statistical measures may be utilized in these graph analytics to determine the relative rankings of key terms/phrases including, for example, a frequency calculation of the key terms/phrases, i.e. how often the term/phrase is utilized in messages/inputs being exchanged between the same participants, or across all participants, inverse document frequency (IDF) where terms/phrases that are least utilized may indicate relatively higher importance, and the like.

Various weighting factors may be applied to these statistical measures or as part of the calculation of these statistical measures based on various attributes or characteristics of the corresponding nodes in the provenance graph. For example, weighting factors may be applied based on characteristics of the speaker, e.g., the role of the speaker within the conversation (moderator, organization, invited participant, etc.), the role of the speaker within the organization associated with the conversation, an aggregate duration of speaking by the speaker during the conversation, previous weighting value(s) associated with the speaker during most recent conversations, and the like. Moreover, weighting factors associated with attributes of the term/phrase nodes, and/or the conversation as a whole, may be used to weight the statistical measures. Such weighting factors may be based on attributes such as to whom the message/input containing the term/phrase was sent, whether or not the term/phrase corresponds to a specified topic of the conversation, e.g., is within a dictionary data structure, synonym data structure, or the like corresponding to the particular topic or domain of the conversation, number of edges that flow into each node.

Based on the statistical measures, potentially including the application of one or more of the various weighting factors, a rank or score for each term/phrase node of the provenance graph may be generated. The rank or score may also be used to provide a relative ranking of the terms/phrases of the nodes to indicate terms/phrases that are of relatively more importance or prominence within the conversation.

Threshold values may be established for these various statistical measures to determine whether to invoke the operation of a cognitive system to assist with the conversation with regard to the specific terms/phrases. For example, if a term/phrase importance or prominence in the conversation become above a determined threshold, it may mean that there is a lot of discussion of the topics associated with that term/phrase and that additional assistance in the conversation may be provided by the cognitive system that may assist the participants. For example, if the frequency of the term/phrase is relatively large, the term/phrase is associated with the specified topic of the conversation (which may be determined from metadata or a description associated with the defined event of the conversation in a conference application, calendar application, determined from cognitive evaluation of the messages exchanged as part of the conversation, or the like), and the participants sending messages/input including such terms/phrases are relatively more important speakers in the conversation, then the combination of these statistics and weighting factors may cause the rank/score of the term/phrase to meet or exceed the threshold rank/score value.

In response to determining that operation of the cognitive system may assist with the conversation regarding a particular term/phrase, such as based on the threshold determination as noted above, for example, a request/question may be sent to the cognitive system, referencing the term/phrase, for processing and return of results. For example, the cognitive system may employ a question answering system that receives a request/question from the conversation monitoring system where the request/question may reference the term/phrase in a structured or unstructured (natural language) manner, e.g., a question of the type "What is [term/phrase]?", or a request of "retrieve information about [term/phrase]." The request/question may be further defined in terms of the particular topics or the domain associated with the conversation, e.g., "What is [term/phrase] with regard to [topic]?" or "retrieve information about [term/phrase] with regard to [topic]." The cognitive system may then process the question/request and perform cognitive analysis to generate a response/answer.

The response/answer generated by the cognitive system may be injected into the conversation to assist with the conversation. For example, a message/input may be generated, such as a natural language statement, that is transmitted to a participant 110-116 associated with the term/phrase as indicated in the provenance graph 100. For example, if participant 112 is determined to be associated with the term/phrase "strategy" and the cognitive system is employed to provide additional information about the strategy associated with a topic of the conversation, e.g., project X, then the retrieved information from one or more corpora obtained by the cognitive system may be returned to the participant 112 as a message/input of the type "the strategy for project X is . . . " This message/input may be interjected into the conversation as an audible or textual message/input that is perceivable by all the participants, only participant 112, participant 112 and a target of previous messages/inputs referencing the term/phrase, or the like. In some embodiments, the message/input generated based on the results provided by the cognitive system may be in a different mode than the conversation, e.g., while the participant 112 may be conversing using audible messages/inputs, e.g., speech input, the message/input from the cognitive system may be sent to the participant 112 as a text message on a same of different communication device used for conducting the conversation. For example, the participant 112 may be conversing with the other participants 110 and 114-116 via a voice over IP connection, while the message/input based on the cognitive system may be sent as a text message to the participant's 112 mobile telephone. The participant profile information may be utilized to identify preferences and contact information for transmitting such messages/inputs.

Thus, the illustrative embodiments provide mechanisms for dynamic monitoring of a conversation, extraction of terms/phrases, and evaluation of the relative importance of the terms/phrases for purposes of determining if and when cognitive system assistance may be provided during the conversation. In addition, operations may be performed based on the provenance graph 100 after conclusion of the conversation. Such operations may include, for example, summarization of the conversation, generating reports, and the like. Such operations may involve, again, ranking terms/phrases found to be of relative importance within the conversation, but may also involve evaluating and ranking the speakers and participants of the conversation.

As shown in FIG. 2, with regard to ranking the terms/phrases and speakers/participants in a conversation after the conversation has concluded, an aggregate provenance graph 200 may be generated. The aggregate provenance graph 200 may aggregate any separate provenance graphs 100 generated during the conversation, e.g., separate sub-conversations that may have occurred between participants that are not linked to other sub-conversations. Moreover, the aggregate provenance graph 200 may aggregate the term/phrase nodes of provenance graphs 100 to generate aggregate nodes that indicate the relative frequency of terms/phrases exchanged in messages/inputs between participants 110-116. For example, aggregate node 210 indicates that the terms/phrases business management, corporation, and the like, are used more often and thus, ranked more highly, than other terms in messages exchanged between participants 110 and 112 (represented by the relatively larger depiction of these terms/phrases in the node shown in FIG. 2, similar to a word cloud graph, for example). Similar aggregate nodes 212-216 may be generated for the various messages/inputs passed between the other participants 112-116 as well. Thus, each pathway between participants 110-116 over which messages/inputs flow will have an aggregate node 210-216 and edges 220-234 showing the flow of the key terms/phrases between participants 110-116. With regard to each aggregate node 210-216, the rankings/scores of the terms/phrases may be generated in a manner similar to that described above, with the rankings/scores across multiple provenance graphs 100 being aggregated.

The ranking/scores of the various participants 110-116 may be determined using various characteristics of the participants 110-116 themselves, again examples of which may be role within the conversation, role within the organization, demographic information, location information, or the like. Roles having higher prominence than others increase the ranking/score of the participant. Such rankings/scores may be used to evaluate participation by the various participants as well as potential issues and concerns regarding various terms used by participants. For example, an analysis of the provenance graph may reveal demographic and/or location biases for certain terms. This may reveal potential issues that need to be handled. For the purposes of labelling a speaker, such analysis may be helpful, for example, to determine if the terms used by a first speaker are similar to the terms used by other speakers from the same demographic/location. This may indicate how similar the first speaker is with respect to his/her demographic/location cluster to other speakers within the same cluster, e.g., determining whether the speaker is expressing conformity views or different from his/her demographic/location cluster.

The rankings/scores may also be generated based on attributes or characteristics of the conversation itself including, for example, how many edges in the provenance graph originate from and/or are directed to the participant's node 110-116, i.e. a relative amount of participation of the participant 110-116 in the conversation. Moreover, the specialty of the participant 110-116 and its correspondence with the topic(s) and/or domain of the conversation may be evaluated such that participants 110-116 having a specialty that corresponds to the topics/domain of the conversation are ranked/scored higher than other participants. An amount of time spent conversing within the conversation, as indicated by the timestamps of messages, number of messages, and the like, sourced by the participant 110-116, may be indicative of a relatively larger contribution to the conversation and thus, an increased ranking/score for the participant 110-116.

The various factors for calculating the ranking/score of participants 110-116 may be aggregated, using a desired function for the particular implementation, to generate for each participant 110-116 a ranking/score. The ranking/score values may be used to generate a relative ranking amongst the participants 110-116. For example, as shown in FIG. 2, participant 112 is ranked relatively as highest having rank "1", participant 110 is ranked second highest "2", participant 116 is ranked third "3", and participant 114 is ranked fourth "4."

The rankings of the terms/phrases and/or the participants 110-116 may be utilized to generate a summary of the conversation and/or report regarding the terms/phrases and/or participants 110-116. For example, a summary data structure may be generated that specifies the relatively higher ranked terms/phrases included during the conversation, e.g., the highest ranking terms/phrases above a predetermined threshold, potentially associated with the participants 110-116 that contributed the terms/phrases. Moreover, information about which participants 110-116 were more influential in the conversation than others may be provided based on the relative rankings. Similarly, reports regarding participants 110-116 may be generated based on aggregate rankings/scores of the participants 110-116 across multiple conversations so as to evaluate the influence of the participants 110-116 as a whole in collaborations with other participants. This may be useful when performing personnel evaluations and other human resources type operations. Furthermore, the summaries may be used to document the conversation and provide reference materials for later use by the participants and other parties when determining what was discussed during the conversation and who contributed to the discussion.

It should be appreciated that the depictions of the provenance graph and the corresponding descriptions herein are only examples and many modifications may be made to the way in which the provenance graph data structures are structured without departing from the spirit and scope of the present invention. For example, the provenance graph and its corresponding data structure(s) may be configured such that the provenance graph comprises "speaker" nodes, which represent the speakers (which may or may not include all participants), and "content" edges, which carry information of all the exchanges between a pair of speakers. At a given edge, connecting for example speaker S1 to speaker S2, all the key terms extracted from communications exchanged between these speakers S1 and S2 are stored in chronological order along with their timestamp. This allows the mechanisms of the illustrative embodiments to calculate frequency of terms as needed. From the provenance graph, the mechanisms of the illustrative embodiments may extract frequency-based information, create word clouds, or a ranking of the exchanged terms, etc. as discussed previously. Identifying terms that are common across speakers and other statistics can all be relegated to post-processing operations after the conversation has concluded, for example.

Figure 3:
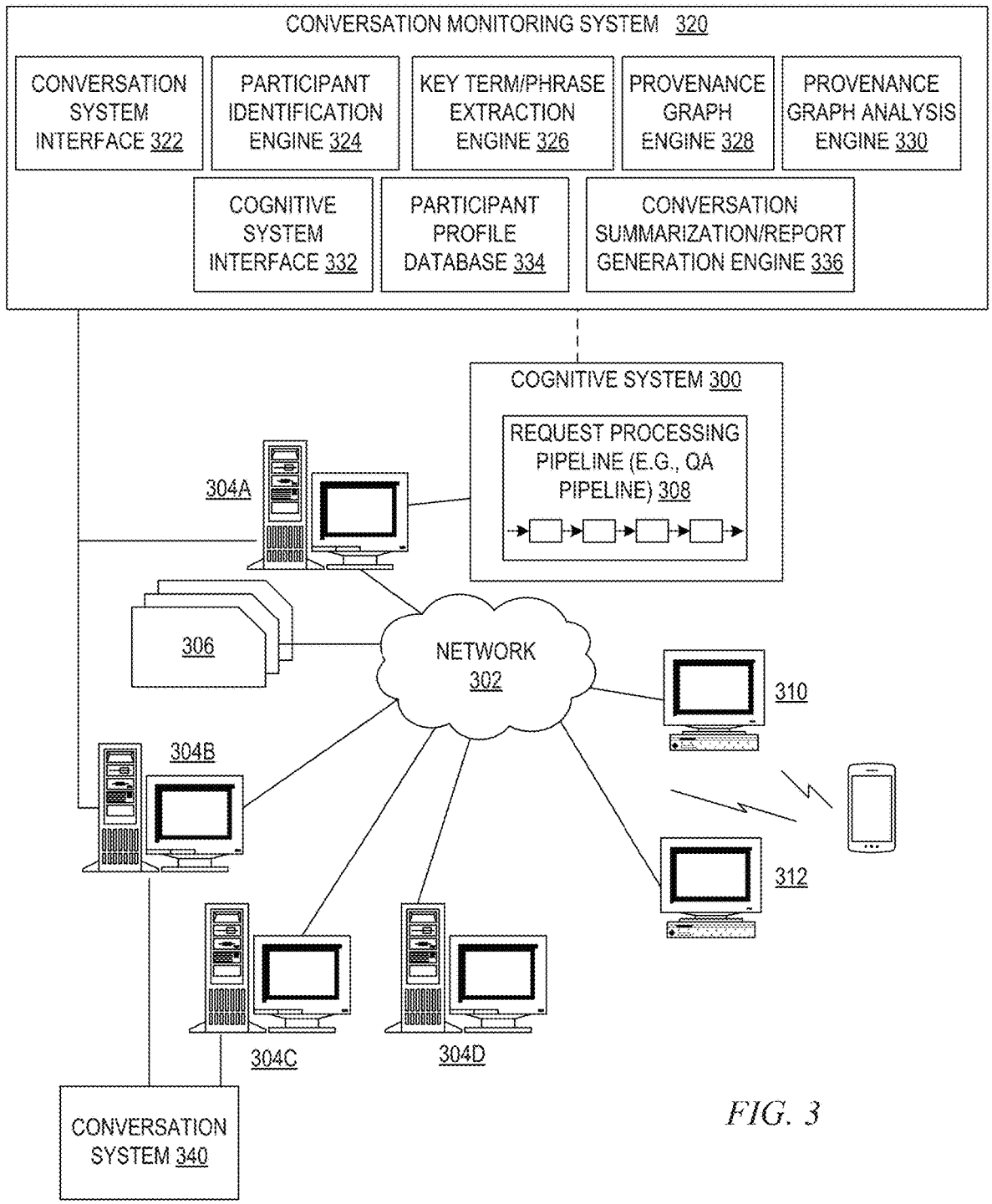
FIG. 3 depicts a schematic diagram of one illustrative embodiment of a cognitive system in a computer network.
Figure 4:
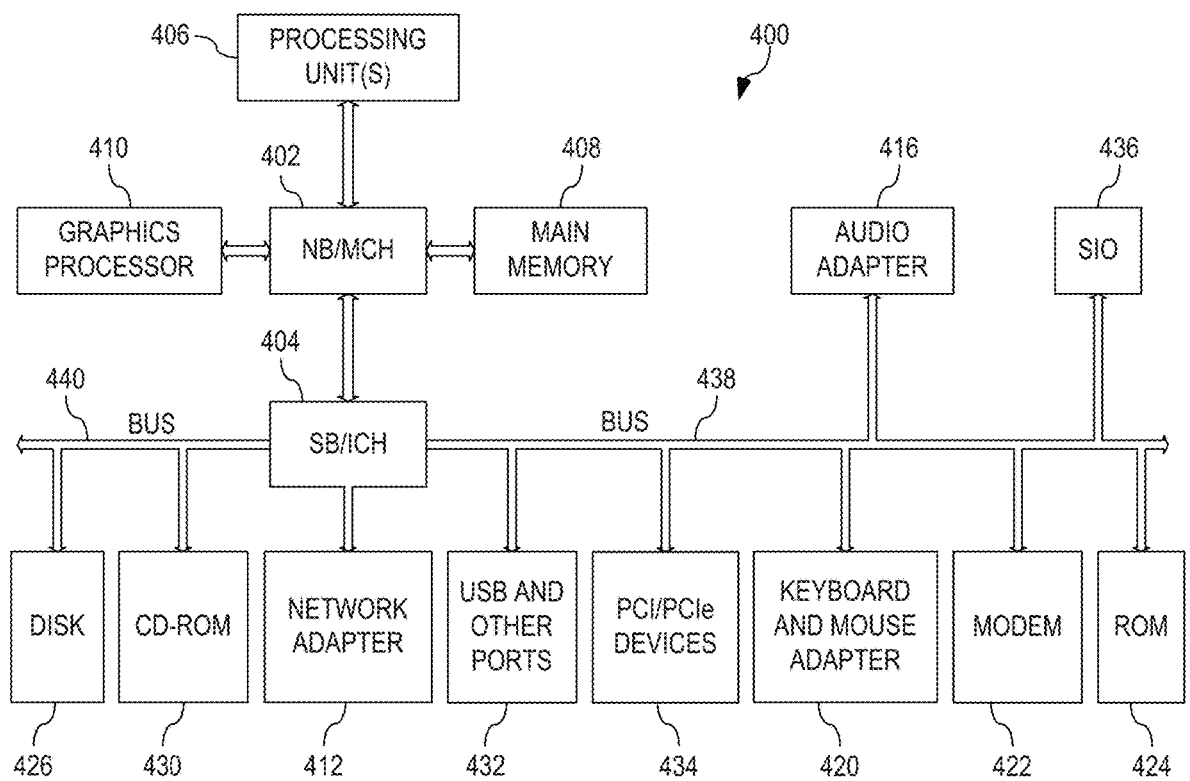
FIG. 4 is a block diagram of an example data processing system in which aspects of the illustrative embodiments are implemented.
Figure 5:
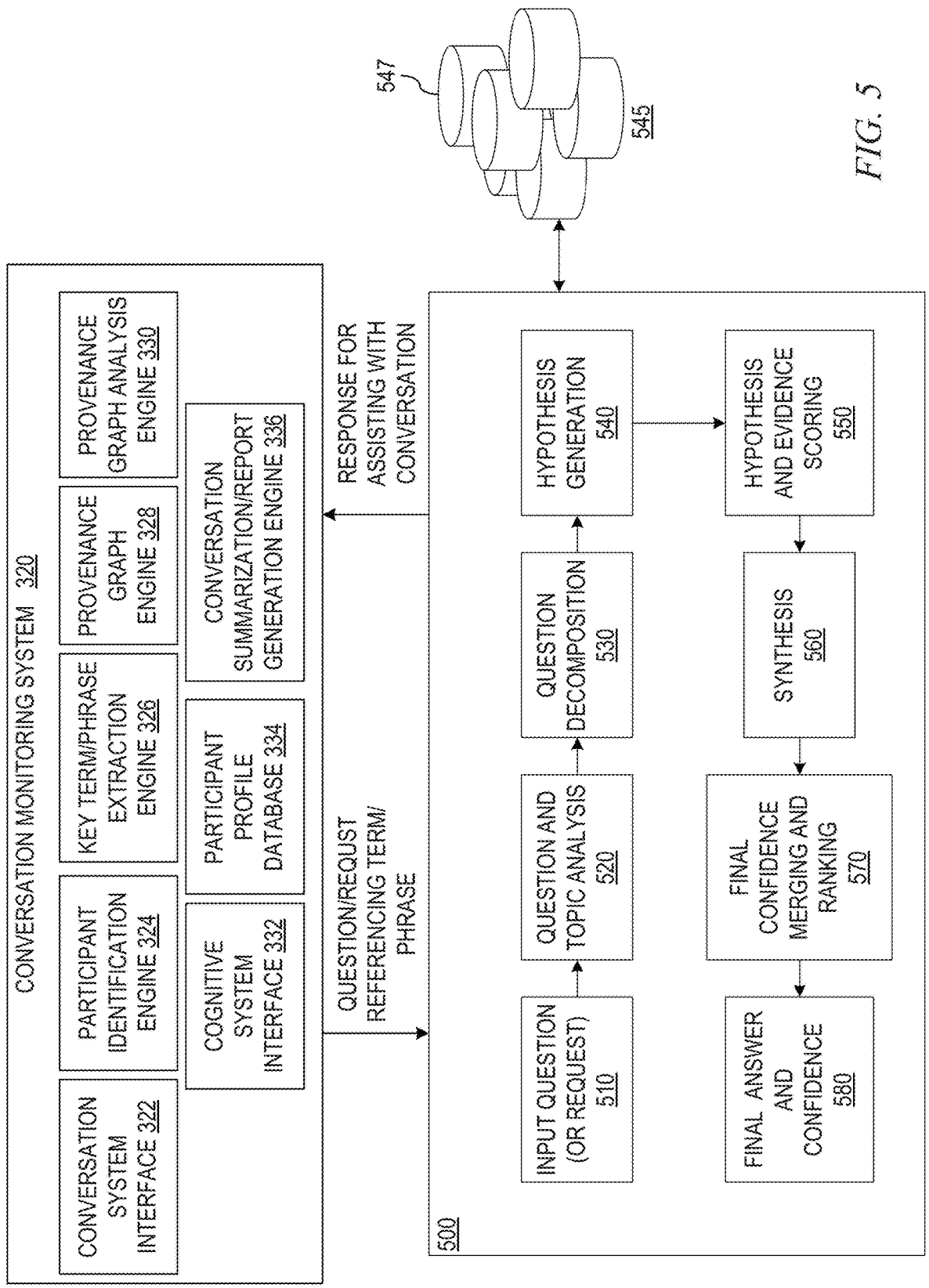
FIG. 5 illustrates a cognitive system processing pipeline for processing a natural language input to generate a response or result in accordance with one illustrative embodiment.

The illustrative embodiments may be utilized in many different types of data processing environments. In order to provide a context for the description of the specific elements and functionality of the illustrative embodiments, FIGS. 3-5 are provided hereafter as example environments in which aspects of the illustrative embodiments may be implemented. It should be appreciated that FIGS. 3-5 are only examples and are not intended to assert or imply any limitation with regard to the environments in which aspects or embodiments of the present invention may be implemented. Many modifications to the depicted environments may be made without departing from the spirit and scope of the present invention.

As discussed above, in some illustrative embodiments, the ranking mechanisms of the illustrative embodiments may be utilized in conjunction with a cognitive system, such as a cognitive search engine, a cognitive question answering system, or other natural language processing based system. The cognitive system may be utilized to dynamically retrieve additional information to assist with the conversation monitored by the ranking mechanisms of the illustrative embodiments. The following figures will assume such an embodiment. However, it should be appreciated that the operations of the present invention need not include the cognitive system as a required component but may instead perform the after-conversation operations described hereafter, such as conversation summarization, speaker ranking report generation, and the like.

FIGS. 3-5 are directed to describing an example cognitive system which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. For example, in the context of the present invention, based on a relative ranking of terms/phrases during a monitored conversation, a request/question may be generated based on identified key terms/phrases to retrieve additional information to assist with the conversation, e.g., provide additional reference information, clarifying definitions and explanations of terms/phrases, retrieve specific project, product, and/or service information, or any of a plethora of other types of information, answers to questions, or the like, that may be retrieved or generated based on a cognitive evaluation of one or more corpora of information.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a patient diagnostics, while a second request processing pipeline may be associated with current medical trials. In other cases, for example, the request processing pipelines may be configured to provide different types of cognitive functions or support different types of applications, such as one request processing pipeline being used for performing cognitive searches of the corpus for information, while another pipeline may be concerned with evaluating financial markets and providing real-time information about stocks, bonds, and investments of various types, etc.

Moreover, each request processing pipeline may have their own associated corpus or corpora that they ingest and operate on, e.g., one corpus for medical documents and another corpus for financial domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of a format like "What is [term/phrase] with regard to [topic/domain]?", the cognitive system may instead receive a request of "retrieve information regarding [term/phrase] and [topic/domain]," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As the mechanisms of the illustrative embodiments may dynamically invoke the operation of the cognitive system to assist with a conversation, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 3-5 are only examples and are not intended to state or imply any limitation with regard to the type of cognitive system mechanisms with which the illustrative embodiments are implemented. Many modifications to the example cognitive system shown in FIGS. 3-5 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 3 depicts a schematic diagram of one illustrative embodiment of a cognitive system 300 implementing a request processing pipeline 308, which in some embodiments may be a question answering (QA) pipeline, in a computer network 302. For purposes of the present description, it will be assumed that the request processing pipeline 308 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D.

The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 300 and network 302 enables question processing and answer generation (QA) functionality for one or more cognitive system users via their respective computing devices 310-312. In other embodiments, the cognitive system 300 and network 302 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 300 may be used with components, systems, subsystems, and/or devices other than those that are depicted herein. In the context of the present invention, the cognitive system 300 may respond to requests/questions submitted to it from the conversation monitoring system 320 in response to a determination that a term/phrase identified in the content of the conversation may need clarification information, additional related information, or the like, provided to participants in the conversation to assist with the conversation.

The cognitive system 300 is configured to implement a request processing pipeline 308 that receive inputs from various sources. The requests may be posed in the form of a natural language question, natural language request for information, natural language request for the performance of a cognitive operation, or the like. For example, the cognitive system 300 receives input from the network 302, a corpus or corpora of electronic documents 306, cognitive system users, the conversation monitoring system 320, and/or other data and other possible sources of input. In one embodiment, some or all of the inputs to the cognitive system 300 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input questions/requests to the cognitive system 300 that are answered/processed based on the content in the corpus or corpora of data 306. Conversation monitoring system 320 may access the cognitive system 300 via a direct connection, via the network 302, or any other suitable communication connection.

In one embodiment, the questions/requests are formed using natural language. The cognitive system 300 parses and interprets the question/request via a pipeline 308, and provides a response to the cognitive system user, e.g., cognitive system user 310, containing one or more answers to the question posed, response to the request, results of processing the request, or the like. In some embodiments, the cognitive system 300 provides a response to users in a ranked list of candidate answers/responses while in other illustrative embodiments, the cognitive system 300 provides a single final answer/response or a combination of a final answer/response and ranked listing of other candidate answers/responses.

The cognitive system 300 implements the pipeline 308 which comprises a plurality of stages for processing an input question/request based on information obtained from the corpus or corpora of data 306. The pipeline 308 generates answers/responses for the input question or request based on the processing of the input question/request and the corpus or corpora of data 306. The pipeline 308 will be described in greater detail hereafter with regard to FIG. 5.

In some illustrative embodiments, the cognitive system 300 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 306. Based on the application of the queries to the corpus or corpora of data 306, a set of hypotheses, or candidate answers/responses to the input question/request, are generated by looking across the corpus or corpora of data 306 for portions of the corpus or corpora of data 306 (hereafter referred to simply as the corpus 306) that have some potential for containing a valuable response to the input question/response (hereafter assumed to be an input question). The pipeline 308 of the IBM Watson™ cognitive system then performs deep analysis on the language of the input question and the language used in each of the portions of the corpus 306 found during the application of the queries using a variety of reasoning algorithms.

The scores obtained from the various reasoning algorithms are then weighted against a statistical model that summarizes a level of confidence that the pipeline 308 of the IBM Watson™ cognitive system 300, in this example, has regarding the evidence that the potential candidate answer is inferred by the question. This process is repeated for each of the candidate answers to generate ranked listing of candidate answers which may then be presented to the user that submitted the input question, e.g., a user of client computing device 310, or from which a final answer is selected and presented to the user. More information about the pipeline 308 of the IBM Watson™ cognitive system 300 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In the context of the present invention, cognitive system 300 may provide a cognitive functionality for providing clarifications, additional related information, or other content related to key terms/phrases identified in a conversation monitored by the conversation monitoring system 320. The conversation monitoring system 320 includes logic implemented in specialized hardware, software executed on hardware, or any combination of specialized hardware and software executed on hardware, for performing operations as described above to monitor a conversation, which may be a multi-modal conversation, e.g., audio based messaging, text based messaging, video based messaging, or the like. Based on the monitoring of the conversation, key terms/phrases exchanged in messages/input by participants in the conversation are identified and used, along with identification of the participants, to generate one or more provenance graph representations of the conversation. Statistical measures of these key terms/phrases are generated and evaluated based on the provenance graph data structure(s) and the cognitive system 300 may be invoked to assist with the conversation with regard to key terms/phrases and their ranking/scores. Moreover, summarizations and reports may be generated based on the ranking/scores of terms/phrases occurring in the conversation, as well as the ranking/scores of participants in the conversation.

As shown in FIG. 3, the conversation monitoring system 320 comprises a conversation system interface 322, a participant identification engine 324, a key term/phrase extraction engine 326, a provenance graph engine 328, a provenance graph analysis engine 330, a cognitive system interface 332, a participant profile database 334, and a conversation summarization/report generation engine 336. The conversation monitoring system 320 may be implemented on one or more data processing systems or computing devices, such as server 304A and/or 304B, as one or more hardware/software mechanisms as noted above. If implemented on a same computing device or data processing system as the cognitive system 300, the conversation monitoring system 320 may have a direct communication connection with the cognitive system 300. Otherwise, the conversation monitoring system 320 may communicate with the cognitive system 300 via the network 302.

The conversation system interface 322 interfaces with a conversation system 340 that is used to conduct the conversation between participants, which may communicate as part of the conversation using communication devices, computing devices 310, 312, or the like, via the network 302, for example. The conversation system 340 may be part of the same computing device or data processing system as the conversation monitoring system 320, e.g., server 304A and/or 304B, or may be on a separate computing device or data processing system which may be otherwise accessible, such as via the network 302. Information about the participants may be retrieved from the conversation system 340, e.g., login information, device information, and the like, via the conversation system interface 322 and the conversation system 300 may request monitoring by the conversation monitoring system 320 via the conversation system interface 322.

Information about the conversation as a whole may be obtained from the conversation system 340 based on the request for monitoring. The request may be generated by the conversation system 340 and may specify certain attributes of the conversation as a whole, e.g., topics, participants, time, location, etc. A calendar application may be accessed to obtain some of this information, e.g., calendar events may be scheduled that specify topics, participants, timing, and location information. The calendar application may be part of the conversation system 340 which may be any system used to assist with communications between participants, e.g., a web conferencing application, a teleconferencing application, instant messaging application, chat application, or the like.

The information about the participants may be provided to the participant identification engine 324 which may retrieve participant profile information from a participant profile database 334, which may be part of the conversation monitoring system 320, part of the conversation system 340, or part of a separate computing device or data processing system. As noted above, the participant profile information in the participant profiles retrieved by the participant identification engine 324 provide information for weighting key term/phrase nodes in the provenance graph, evaluating the participants with regard to their contributions to the conversation, and the like.

The key term/phrase extraction engine 326 comprises logic for performing the operations described above for identifying and extracting key terms/phrases in messages/inputs exchanged by participants of the conversation. As such, the key term/phrase extraction engine 326 may utilize natural language processing logic and natural language processing resources and data structures, e.g., dictionary data structures, synonym data structures, domain or topic specific term/phrase identification data structures, and the like, to identify key terms/phrases that may be specific to the particular topic and/or domain of the conversation. In some cases, the natural language processing mechanisms may be provided in the cognitive system 300 and/or pipeline 308, and may be enlisted by the conversation monitoring system 320 to perform the key term/phrase extraction.

The provenance graph engine 328 provides logic for generating/updating one or more provenance graphs associated with the conversation based on the identification of the participants and the extraction of key terms/phrases from the messages/inputs exchanged by the participants during the conversation. The provenance graph(s) generated by the provenance graph engine 328 may be provided to the provenance graph analysis engine 330 for dynamic analysis during the conversation and/or analysis after completion of the conversation, so as to generate statistical measures of the nodes in the provenance graph(s) and determine dynamically whether the cognitive system 300 should be invoked to assist with the conversation and/or provide rankings/scores for generation of conversation summaries and participant based reports, as described previously above.

The cognitive system 332 provides logic for facilitating communication between the conversation monitoring system 320 and the cognitive system 300. In some cases, the cognitive system interface 332 may comprise logic for formulating questions/requests based on identified key terms/phrases and the topics/domain of the conversation for processing by the cognitive system 300. The questions/requests may be sent to the cognitive system 300 and processed by the pipeline 308 as discussed above. The response/answer generated by the cognitive system 300 may be returned to the conversation monitoring system 320 via the cognitive system interface 332 and then used by the conversation system interface 322 to formulate an addition to the conversation facilitated by the conversation system 340, by injected a corresponding message/input into the conversation via the conversation system interface 322 and/or sending the message/input to a participants' device, e.g., computing device 310.

The conversation summarization/report generation engine 336, based on the statistical values and rankings/scores generated by the provenance graph analysis engine 330, provides logic for generating a conversation summary and/or report of participant contributions to the conversation. The summarization may include the terms/phrases having ranks/scores that meet or exceed established thresholds and thus, are most representative of the content of the conversation. Moreover, the ranking of the participants provides an indication of which participants were most influential in the conversation. This information may also be used by the participant identification engine 324 to update weighting values associated with participants and/or human resources systems (not shown) for evaluating the participants.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server 304 or client 310 in FIG. 3, in which computer usable code or instructions implementing the processes for illustrative embodiments of the present invention are located. In one illustrative embodiment, FIG. 4 represents a server computing device, such as a server 304, which, which implements a cognitive system 300 and QA system pipeline 308 augmented to include the additional mechanisms of the illustrative embodiments described hereafter.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 8®. An object-oriented programming system, such as the Java™ programming system, may run in conjunction with the operating system and provides calls to the operating system from Java programs or applications executing on data processing system 400.

As a server, data processing system 400 may be, for example, an IBM® eServer™ System P® computer system, running the Advanced Interactive Executive (AIX®) operating system or the LINTJX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

FIG. 5 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 5 is provided only as one example of the processing structure that may be implemented to process a natural language input requesting the operation of a cognitive system to present a response or result to the natural language input.

The QA system pipeline of FIG. 5 may be implemented, for example, as QA pipeline 308 of cognitive system 300 in FIG. 3. It should be appreciated that the stages of the QA pipeline shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 5 is augmented, for example, in one or more of the stages to implement the improved mechanism of the illustrative embodiments described hereafter, additional stages may be provided to implement the improved mechanism, or separate logic from the pipeline 500 may be provided for interfacing with the pipeline 500 and implementing the improved functionality and operations of the illustrative embodiments.

As shown in FIG. 5, the QA pipeline 500 comprises a plurality of stages 510-580 through which the cognitive system operates to analyze an input question and generate a final response. In an initial question input stage 510, the QA pipeline 500 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 5, the identified major features are then used during the question decomposition stage 530 to decompose the question into one or more queries that are applied to the corpora of data/information 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 545. That is, these various sources themselves, different collections of sources, and the like, represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

Figure 1C:
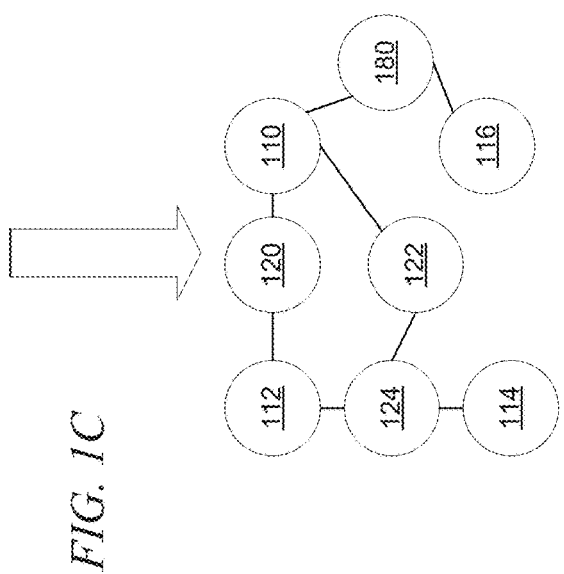

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA pipeline 500 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 500 that identifies a manner by which these scores may be combined to generate a confidence score or measure for the individual hypotheses or candidate answers. This confidence score or measure summarizes the level of confidence that the QA pipeline 500 has about the evidence that the candidate answer is inferred by the input question, i.e. that the candidate answer is the correct answer for the input question.

The resulting confidence scores or measures are processed by a final confidence merging and ranking stage 570 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

As shown in FIG. 5, in accordance with one illustrative embodiment, the pipeline 500 receives the input question or request from the conversation monitoring system 320. As noted above, this may be in response to a dynamic determination that a key term/phrase in a conversation has achieved a sufficient ranking/score within the conversation to warrant invoking the cognitive system to provide additional information to assist with the conversation with regard to the term/phrase. Thus, the question/request referencing the term/phrase, and optionally the topic/domain of the conversation, may be output to the pipeline 500 which processes it in the manner described above and provides a response to the conversation monitoring system 320. The response is used to assist with the conversation by providing additional clarifying information or related information to the content of the conversation with regard to the specific term/phrase and/or topic/domain.

Figure 6:
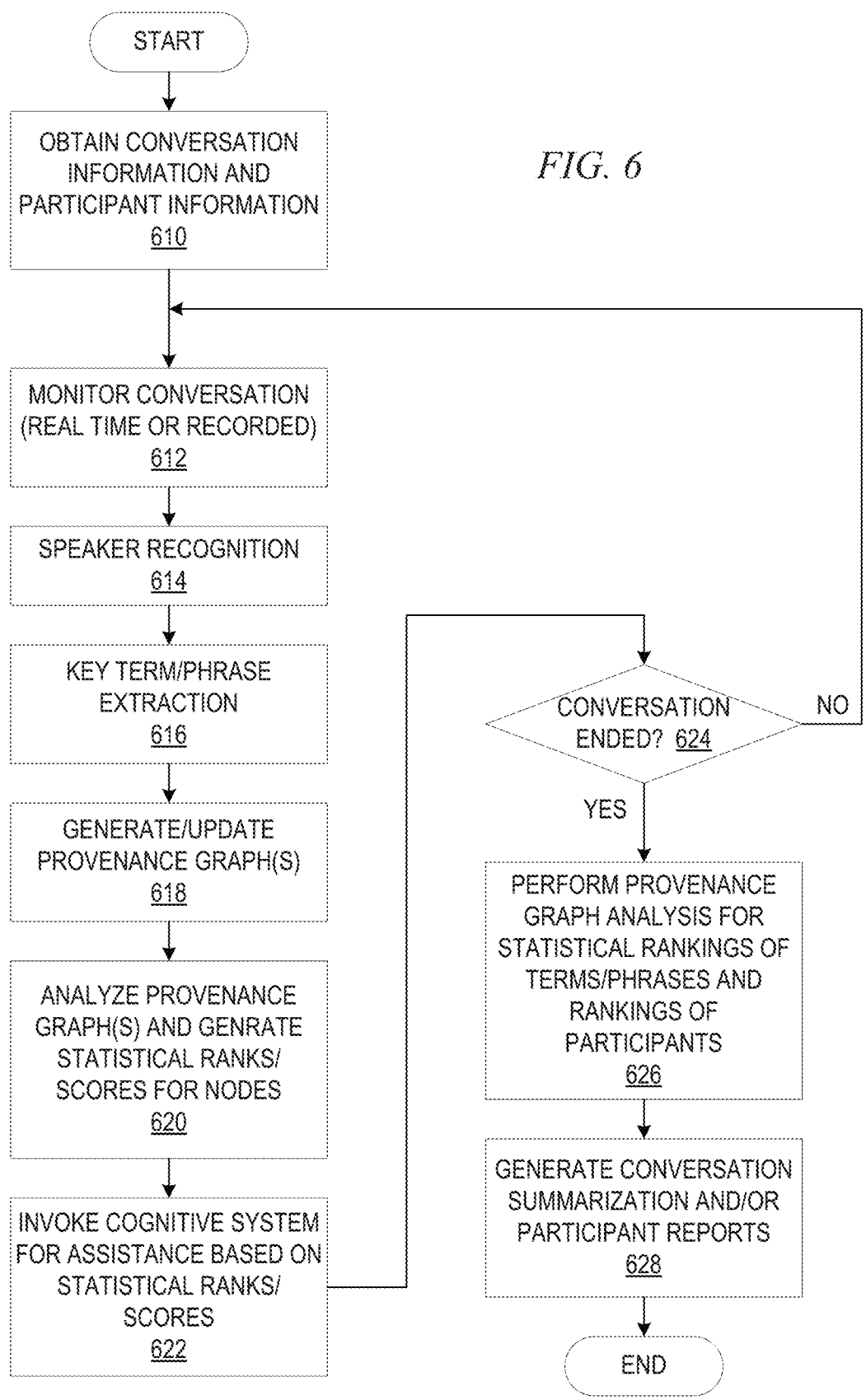
FIG. 6 is a flowchart outlining an example operation for performing conversation monitoring and assistance in accordance with one illustrative embodiment.

FIG. 6 is a flowchart outlining an example operation for performing conversation monitoring and assistance in accordance with one illustrative embodiment. As shown in FIG. 6, the operation starts with obtaining conversation information, e.g., topic/domain, time, location, participants, etc., and participant information, e.g., participant profiles corresponding to participant identifiers (step 610). The conversation is monitored, either in real time or based on a recording of a previously conducted conversation (step 612) and the speakers during the conversation are identified (step 615) and key terms/phrases are extracted (step 616). One or more provenance graphs are generated/updated based on the speaker recognition and key term/phrase extraction (step 618).

The provenance graph(s) may be analyzed dynamically during the conversation to determine statistical rankings/scores for nodes of the provenance graph(s) (step 620). Based on the determined statistical rankings/scores, a cognitive system may be invoked to assist with the conversation where necessary and provides additional clarifying or related information for use by one or more of the participants in the conversation (step 622).

A determination is made as to whether the conversation has ended or not based on various types of termination event possibilities as noted previously (step 624). If the conversation has not ended, then the operation returns to step 612 with continued monitoring of the conversation. If the conversation has ended, provenance graph analysis may be performed to determine statistical rankings of terms/phrases and participants (step 626). Conversation summarization data structure(s) and participant report(s) may be generated based on the statistical rankings (step 628) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable medium having a computer readable program stored therein, wherein the computer readable program, when executed on a computing device, configures the computing device to implement a conversation monitoring system that operates to:

monitor a conversation between at least two participants;

extract key terms present in communications between the at least two participants;

generate a provenance graph data structure based on the extraction of the key terms, wherein the provenance graph data structure comprises speaker nodes representing the at least two participants, term nodes representing the key terms present in the communications, and edges connecting nodes in the provenance graph;

analyze the provenance graph data structure to identify a relative ranking of the key terms within the conversation;

generate an output representing content of the conversation based on the relative ranking of the key terms; and perform a cognitive operation on at least one communication in the conversation based on the relative ranking of key terms, wherein the output comprises a result of the performance of the cognitive operation by the cognitive system, and wherein the cognitive operation comprises analyzing a plurality of provenance graph data structures to identify terms that are emerging terms and terms that are stable terms using a term frequency-inverse document frequency metric for terms associated with term nodes in the provenance graph data structures.

2. The computer program product of claim 1, wherein the output is a summary data structure comprising a summary of the conversation between the at least two participants.

3. The computer program product of claim 1, wherein the computer readable program further causes the computing device to implement a conversation monitoring system that operates to:
analyze the provenance graph data structure with regard to each participant in the at least two participants, to determine a participant contribution measurement indicating a measure of an amount of contribution of the participant to the conversation; and
generate a participant relative ranking data structure based on the participant contribution measurements of the at least two participants, wherein the participant relative ranking data structure ranks each participant relative to other participants in the at least two participants according to their corresponding participant contribution measurements, and wherein the output representing content of the conversation further comprises the participant relative ranking data structure.

4. The computer program product of claim 3, wherein a participant contribution measurement for a participant in the at least two participants is calculated at least based on a weighting factor associated with the participant.

5. The computer program product of claim 4, wherein the weighting factor is determined based on at least one of previous evaluations of contributions by the participant during previous conversations, a role of the participant in an organization, a role of the participant in the conversation, or an expertise level of the participant in a topic of the conversation.

6. The computer program product of claim 1, wherein the edges between term nodes represent a temporal flow from one key term node to another key term node during the conversation, and wherein edges between term nodes and speaker nodes represent at least one of a participant in the at least two participants that provided a communication in which the term was present, or a participant in the at least two participants that was a target of the communication in which the term was present.

7. The computer program product of claim 1, wherein term nodes of the provenance graph data structure are associated with key terms in communications of the conversation, and wherein each term node comprises attributes specifying a timestamp of the portion of the conversation where the key term was provided in a communication of the conversation, an identification of a participant that provided the key term in the communication, and a target participant to which the communication was directed.

8. The computer program product of claim 1, wherein speaker nodes in the provenance graph data structure comprise attributes of participants in the at least two participants that submitted at least one communication as part of the conversation, and wherein attributes of speaker nodes comprise demographic information for a corresponding participant and role information for the corresponding participant.

9. The computer program product of claim 1, wherein the computer readable program further causes the computing device to implement a conversation monitoring system that operates to:
dynamically update the provenance graph data structure to include additional term nodes, speaker nodes, or edges between term nodes or speaker nodes as the conversation progresses between the at least two participants.

10. The computer program product of claim 1, wherein edges in the provenance graph have associated weight values, and wherein the weight value of an edge is determined based on at least one of a weight associated with a term corresponding to a term node connected to the edge, a topic of the term corresponding to the term node connected to the edge, an attribute of a source speaker node connected directly or indirectly to the edge and which is a source of a communication in which the term is present, or an amount of time represented in the provenance graph that a participant corresponding to the source speaker node connected directly or indirectly to the edge has been communicating during the conversation.

11. The computer program product of claim 1 wherein the cognitive operation comprises:
performing a cognitive search operation to identify explanatory information for one or more highest relatively ranked key terms from a corpus of electronic documents;
and interjecting the explanatory information into content of the conversation as a natural language communication generated by the cognitive system.

12. The computer program product of claim 1, wherein analyzing the provenance graph data structure to identify a relative ranking of the key terms within the conversation comprises:
calculating, for each term node in the provenance graph data structure, a statistical measure of relative ranking of the term node based on a frequency of occurrence of the term node across multiple conversation flows between the at least two participants, in the provenance graph data structure;
weighting, for each term node, a corresponding statistical measure of relative ranking based on one or more weighting factors; and
generating the relative ranking of the key terms within the conversation based on the weighted statistical measures of relative ranking of the term nodes in the provenance graph data structure.

13. The computer program product of claim 12, wherein the calculation is performed dynamically while the conversation between the at least two participants is being conducted, and wherein a cognitive operation is performed based on the weighted statistical measures to provide supplemental information from a corpus of electronic documents, corresponding to one or more relatively highest ranked terms.

14. The computer program product of claim 12, wherein the one or more weighting factors comprise one or more weighting factors based on demographic, role, or location attributes of a participant with which the term node is linked by an edge in the provenance graph data structure.

15. The computer program product of claim 12, wherein the computer readable program further causes the computing device to implement a conversation monitoring system that operates to:
generate a question referencing a term in the output having a relative ranking equal to or above a threshold ranking;

input the question to a question answering (QA) system;

process, by the QA system, the question based on a cognitive analysis of a corpus of electronic documents to generate a response to the question;

return, by the QA system, the response to the question to the conversation monitoring engine; and add a communication to the conversation based on the response to the question.

16. The computer program product of claim 1, wherein the computer readable program further causes the computing device to implement a conversation monitoring system that operates to:

retrieve attributes of the conversation from a conversation system used to exchange communications between the at least two participants during the conversation; and retrieve, from a participant profile database, a participant profile for each participant in the at least two participants, wherein the participant profile specifies attributes of the participant, wherein analyzing the provenance graph data structure to identify a relative ranking of the key terms within the conversation comprises applying weighting factors based on the attributes of the conversation and the attributes of the participants.

17. The computer program product of claim 1, wherein the provenance graph data structure is an aggregation of a plurality of other provenance graph data structures corresponding to sub-conversations between sub-sets of participants in the at least two participants during the conversation.

18. An apparatus comprising:

a processor; and a memory coupled to the processor, wherein the memory comprises instructions which, when executed by the processor, configure the processor to implement a conversation monitoring system that operates to:

monitor a conversation between at least two participants;

extract key terms present in communications between the at least two participants;

generate a provenance graph data structure based on the extraction of the key terms, wherein the provenance graph data structure comprises speaker nodes representing the at least two participants, term nodes representing the key terms present in the communications, and edges connecting nodes in the provenance graph;

analyze the provenance graph data structure to identify a relative ranking of the key terms within the conversation;

generate an output representing content of the conversation based on the relative ranking of the key terms; and perform a cognitive operation on at least one communication in the conversation based on the relative ranking of key terms, wherein the output comprises a result of the performance of the cognitive operation by the cognitive system, and wherein the cognitive operation comprises analyzing a plurality of provenance graph data structures to identify terms that are emerging terms and terms that are stable terms using a term frequency-inverse document frequency metric for terms associated with term nodes in the provenance graph data structures.

* * * * *